Figure 1:
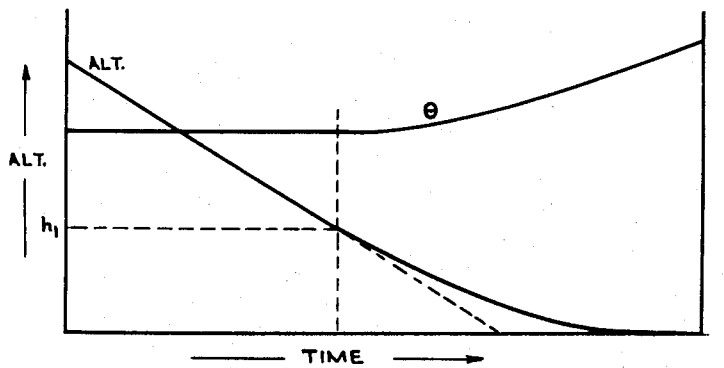

June 7, 1960  P. HOBLEY  2,939,652
AIRCRAFT LANDING SYSTEM
Filed July 2, 1956  2 Sheets-Sheet 1

Inventor:
Peter Hobley
By Ralph B. Stewart,
Attorney

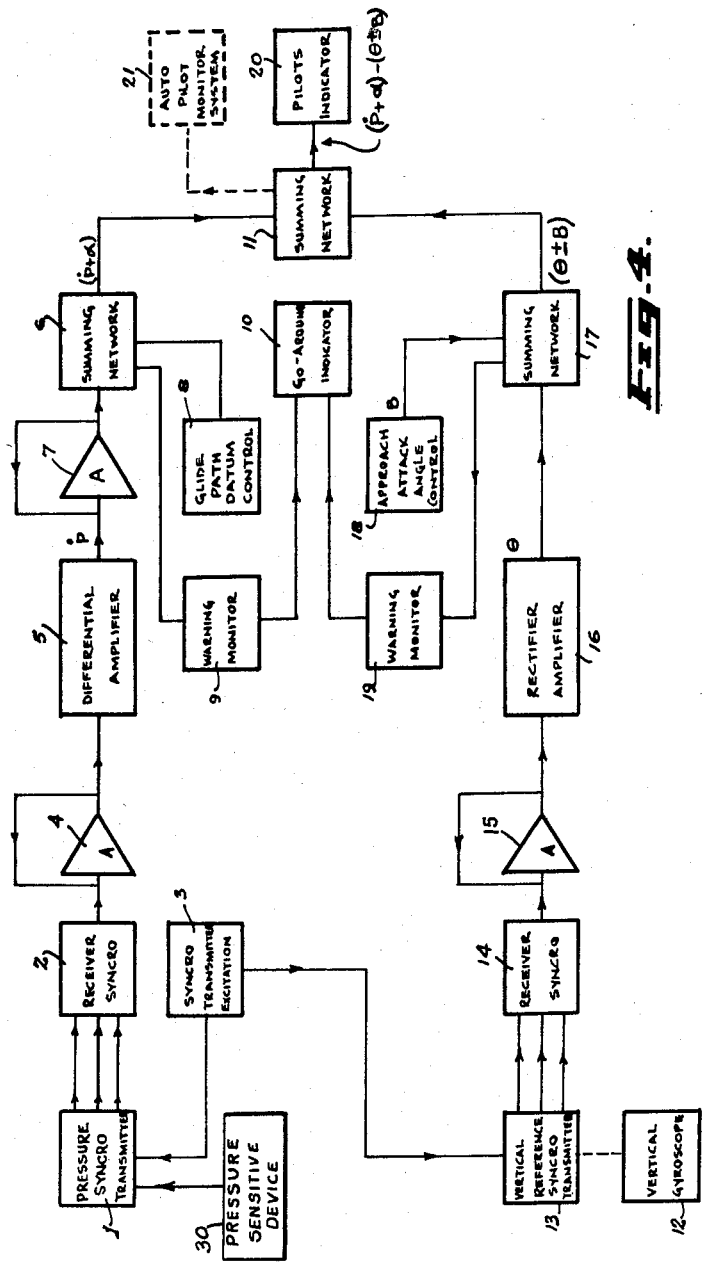

United States Patent Office 2,939,652
Patented June 7, 1960

2,939,652

AIRCRAFT LANDING SYSTEM

Peter Hobley, 103 Michigan Ave., Pointe Claire, Quebec, Canada

Filed July 2, 1956, Ser. No. 595,442

Claims priority, application Canada June 18, 1956

5 Claims. (Cl. 244—77)

This invention relates to an aircraft landing system.

Existing aircraft landing and approach aids such as Ground Controlled Approach (G.C.A.), Instrument Landing System (I.L.S.) and those various devices utilizing the I.L.S. system, can direct aircraft, at best, to within 50 feet of a runway. The pilot must be able to see the runway from this height or no touchdown is possible. In addition, transition from instrument flying conditions to visual flying conditions at a point so late in the approach, makes this operation critical.

Under bad weather conditions it is frequently impossible for the runway to be seen from a height of 50 feet and the aircraft must be diverted to another landing field where conditions are more favourable. Due to the high cost of keeping an aircraft in the air, and in the case of commercial airlines, the extra expense involved in putting up passengers or arranging other transportation to their destination, it is most desirable to be able to land an aircraft in all weather conditions without depending on visual observation of the landing field.

It is therefore an aim of the present invention to provide a system whereby an aircraft may be landed in all weather conditions and without visual observation of the landing field.

More specifically, it is the aim of the present invention to provide a landing system whereby a pilot can execute a landing by controlling his aircraft in response to information provided by an indicator on his instrument panel.

Previously, the problem of landing an aircraft in adverse visibility conditions has been approached with a view to devising more sensitive and accurate height measurement equipment. At low altitude, height measurement from a moving aircraft is difficult and the necessary equipment tends to be cumbersome. Radio and radar altimeters proposed for this purpose are especially bulky and are subject to error in wet weather. Altimeters relying on a measurement of air pressure are subject to correction for day to day variations in local barometric pressure and temperature.

It is therefore a further aim of the present invention to utilize a system which does not rely upon an absolute measurement of height and which does not therefore suffer from inaccuracies due to weather conditions and changes in barometric pressure and temperature.

The present invention proposes deriving a signal proportional to a height dependent variable which exhibits a "flare-out" characteristic near ground level, and comparing this signal with a signal proportional to an angle indicative of the aircraft's attitude. Controlling the aircraft's attitude such that the resultant of these two signals is at a constant level, ensures that aircraft attitude will experience a "flare-out" near ground level, similar to that exhibited by the height dependent variable.

Preferably, the measured height dependent variable is under-wing air pressure which experiences a "flare-out" near ground level due to the constriction of air flow between the wing and ground. The invention also envisages the use of any other measurable quantity, such as the strength of radioactive radiation, which experiences a similar "flare-out" characteristic.

The preferred means for comparing the signal proportional to the height dependent variable and the signal proportional to aircraft attitude, is a null indicating instrument. Deviation from the null reading of this instrument gives the pilot a "nose-up" or "nose-down" warning, correction of which restores the aircraft to its proper attitude.

Figure 2:
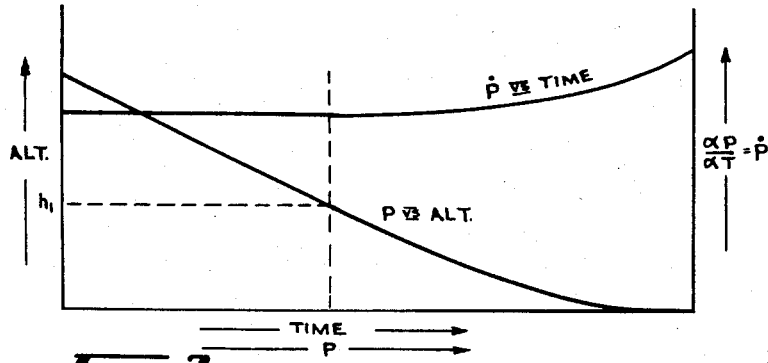
Figure 3:
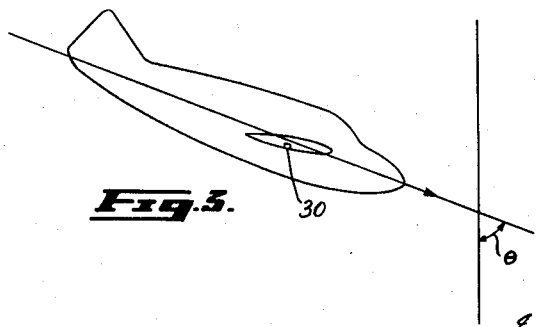

A particular embodiment of the present invention will be described in conjunction with the accompanying drawings in which, Figure 1 is a graph showing the variation of aircraft altitude and aircraft attitude during landing, Figure 2 is a graph showing the height dependence of under-wing air pressure, Figure 3 is a diagram defining a vertical reference angle for an aircraft, and Figure 4 is a block diagram of a circuit for controlling a pilot's landing indicator.

For a given aircraft flying under given conditions, a predetermined glide path must be followed in making a successful landing. The approach manoeuvres place the aircraft a few hundred feet from the end of the runway in a normal glide, the horizontal projection of which coincides with the axis of the runway. The angle of this glide, the height and speed of the aircraft on commencing the glide, are conditions determined by the type of aircraft and the conditions under which the landing is made. The normal glide is unaccelerated flight at a speed of 5–15 m.p.h. above the stalling speed of the aircraft. As the aircraft approaches within 30–50 feet of the ground in this glide, the pilot uses his controls to deflect the aircraft's elevator so as to cause the flight path to "flare-out" and become generally tangential to the ground. Deceleration of the aircraft then causes it to settle the remaining few feet to the ground. The flight path of an aircraft during such a landing is shown in Figure 1.

The well known I.L.S. and G.C.A. systems are essentially approach systems and can effectively provide the lateral and vertical guidance necessary to place an aircraft on the proper glide path. With the I.L.S. system the aircraft approaches the airport from approximately the proper direction with the aid of long-range radio range, or omnidirectional range, and picks up a runway localizer radio beam at a distance of 10 to 30 miles. Following this beam at a constant altitude of say 2000 feet aligns the aircraft with the runway. A glide path localizer transmitter defines an equisignal glide path that provides the vertical guidance needed when following a course defined by the runway localizer. On reaching this equisignal glide path, the plane is nosed down and follows the glide path. The plane's distance from the airfield is indicated by narrow beam radio marker beacons. When the last marker beacon is passed the aircraft is of the order of fifty feet above the runway and the pilot then lands the aircraft visually.

The G.C.A. system provides the same information but depends on a ground operator who "talks down" the aircraft while watching its position on radar screens.

Neither of the systems then, is capable of completing the last stage of the landing.

Referring now to Figure 2, there is plotted as a function of height above ground, the air pressure P measured on the under surface of an aircraft wing. It is well known that under-wing air pressure P depends on (1) the angle of incidence of the wing, (2) aircraft attack angle, (3) air speed, (4) barometric pressure, (5) proximity of aircraft to ground. Considering the region within, say, one hundred feet above ground, it is found that, although barometric pressure decreases logarithmically with height, in this region the barometric variation can be considered linear. Also, during the normal glide preceding a landing, the aircraft's wing angle of incidence, attack angle and air speed are predetermined and depend on the type of aircraft and on the landing conditions. The last factor to be considered, proximity to ground, is neither constant nor linear, and in fact increases approximately as the square of decreasing height. This proximity effect or "ground effect" as it is known, is due basically to the constriction of the air between the lower surface of the aircraft wings and the ground. This effect is well known in aeronautical engineering, and is discussed in most standard works on aerodynamics. For example, see Perkins and Hage, "Airplane Performances, Stability and Control," also "Ground Effect," page 176 of the Aeronautical Dictionary by T. A. Dickinson. It becomes effective at a height $h_1$ from ground which is of the same order as the height at which an aircraft's glide path must begin to "flare-out" for touchdown (Figure 1). Although the change in aircraft attitude necessary to provide the "flare-out" does affect the measured under-wing air pressure by virtue of the first, second and third factors mentioned above, it is found that the proximity effect is of greater magnitude, thus making the under-wing air pressure a variable which is substantially completely dependent upon aircraft height above ground. It is also apparent that a time-rate-of-change measurement of under-wing air pressure would give a quantity which varies as shown by $\dot{P}$ in Figure 2, and which would be independent of day to day variations in barometric pressure.

Referring again to Figure 1, there is plotted as a function of time the variation during a normal landing, of a vertical reference angle $\theta$ defined as the angle between a downwardly directed vertical and a preferred fore-and-aft line of the aircraft, as shown in Figure 3. This angle is directly proportional to the aircraft's attitude, that is, the degree to which the aircraft's nose is up or down. In order to execute a landing, the aircraft's attitude, as controlled by the pilot, and therefore the vertical reference angle $\theta$, must vary as shown by the curve labelled $\theta$ in Figure 1. Therefore, an aircraft having initially been put onto the correct glide path will make a proper landing if its attitude is controlled in the manner shown in Figure 1.

A comparison of the graph of vertical reference angle $\theta$ (Figure 1) and the time-rate-of-change of under-wing air pressure, $\dot{P}$ (Figure 2), suggests that if electrical signals proportional to each of these quantities were generated, and $\theta$ controlled in such a manner that its representative signal followed a variation similar to the variation in the signal representing $\dot{P}$, then $\theta$ would experience a "flare-out" characteristic as required for landing. According to the present invention then, a signal proportional to the vertical reference angle $\theta$ is generated, compared and equalized with a generated signal proportional to the time-rate-of-change of under-wing air pressure. In practice, any convenient method of comparing and equalizing the two signals may be used, but in a preferred method to be described, the signals are adjusted to such a value that when the aircraft is in its correct attitude, the difference between the signals is zero i.e. $\dot{P}-\theta=0$. The difference between the two signals actuates an indicator on the pilot's instrument panel, fly-up or fly-down warnings being given when the resultant signal goes negative or positive respectively. For convenience in the following description, the vertical reference signal will be referred to simply as $\theta$ and the rate-of-change of under-wing air pressure signal will be referred to as $\dot{P}$.

In implementing such a method of landing, it is necessary to provide that any desired glide path angle may be selected and that the approach attack angle of the particular aircraft in question, may be allowed for. In addition, warning must be given if at any time during a landing, either $\dot{P}$ or $\theta$ exceeds predetermined limits. Such a warning will, for convenience, be referred to as a "go-around" indication.

One particular embodiment of a system for carrying out the present landing method is illustrated in Figure 4. Situated in the under-wing surface of the aircraft, a synchro transmitter 1 operated by a well known pressure sensitive device 30, transmits a signal to a receiver synchro 2 situated within the aircraft, the excitation for said synchros being provided by synchro exciter 3. The pressure sensitive device 30 will be placed at a suitable position under the wing where the so-called ground effect will be experienced without interference from extraneous influences, that is, where there is an undisturbed flow of air across the wing surface. The output signal of receiver 2, amplified by a conventional amplifier 4 of preset gain, is fed to a differential amplifier 5 whose output is proportional to the rate-of-change of under-wing air pressure. This rate signal is fed to summing network 6 through stabilised buffer amplifier 7, which prevents the summing network from feeding back into the previous stage and it also effects any impedance matching that may be required.

The signal is modified in summing network 6 by factor $\alpha$ controlled by guide path datum control 8 which is provided for the purpose of controlling the angle of the glide path by a preset control. The glide path datum factor $\alpha$ adds to the rate signal $\dot{P}$ thereby necessitating an increase in the $\theta$ signal and consequently a shallower glide, to maintain the condition $\dot{P}-\theta=0$. Hence the magnitude of the glide path datum factor $\alpha$ controls the angle of the glide path.

If for some reason the signal $(\dot{P}+\alpha)$ decreases to a value which would require a dangerous glide path angle to maintain the condition $\dot{P}-\theta=0$, warning monitor 9 which samples the signal $(\dot{P}+\alpha)$ from summing network 6, actuates a "go-around" indicator 10 to warn the pilot that a dangerous condition exists, and that the approach should be abandoned.

The vertical reference signal $\theta$ is derived from a vertical gyroscope 12 controlling a vertical reference synchro transmitter 13. Receiver synchro 14 located at the instrument group passes this alternating signal to conventional amplifier 15 of preset gain, the amplified signal then being rectified and further amplified in rectifier-amplifier 16. The amplified D.C. vertical reference signal $\theta$ is, in summing network 17, modified by an approach attack angle factor B controlled by approach attack angle control 18. The factor B corrects the vertical reference signal $\theta$ to cancel gyro mounting inaccuracies and any other vertical reference inaccuracies which may be inherent in an installation, while at the same time allowing for different approach attack angles of various aircraft. For otherwise identical approach conditions, one type of aircraft may fly with a nose-up attitude while another type may fly with a nose-down attitude. The approach attack factor B adds or subtracts this attitude deviation from vertical signal $\theta$ so that a vertical reference corrected for individual aircraft characteristics is obtained. This is a preset control and in common with the other system controls, its setting is determined on a flight test of the particular type of aircraft.

A second warning monitor 19, samples the signal $(\theta \pm B)$ and actuates "go-around" indicator 10, should this signal reach a value representing a dangerous glide angle.

The output signal $(\theta \pm B)$ from summing network 17 is combined in summing network 11 with the corrected rate signal $(\dot{P}+\alpha)$, the output $(\dot{P}+\alpha)-(\theta \pm B)$, of this second summing network being fed to a landing indicator 20 on the pilot's instrument panel. The pilot's indicator has a central zero position from which deflection occurs in opposite directions for positive and negative signals. Conveniently, a positive signal indicating that the vertical reference angle θ is too large and the glide angle too shallow, causes the indicator to deflect upwards showing the pilot that the aircraft's nose is too high. Conversely a negative signal deflects the indicator downwards showing the pilot that the aircraft's nose is too low. The pilot controls the aircraft's attitude to maintain the signal zero.

It is provided that the output signal of summing network 11 may be fed to an autopilot system, shown dotted at numeral 21, and thereby control the aircraft's attitude automatically.

It is to be understood that all the components of the above described system are conventional, and that many other systems for deriving and comparing the two signals could be used.

With regard to the pressure sensitive device mentioned above it is to be understood that many types of quick acting pressure sensitive elements and pick-offs known in the art to be useful in the measurement of atmospheric pressure from aircraft, may be used. For example the pressure sensitive element may be of the bellows type which can be made by standard commercial methods to show a large expansion or contraction for quite small changes in pressure, and the pick-off for sensing the pressure dependent displacements of the bellows may be an E-type inductive pick-off. Such a pick-off is well known in the art as comprising a movable ferrous plate mechanically linked to the moving end of the sensing element, this plate being placed so as to bridge the ends of a laminated core of E-shaped cross-section and thus determining the magnetic coupling between the outer arms of the E with respect to the center arm. An energizing coil is wound on the center arm and a pick-up coil is wound on each of the outer arms. The output of the pickup coils is thereby dependent upon the position of the ferrous plate.

The present system could advantageously be combined with an I.L.S. system in such a manner that runway localizer information provided by the I.L.S. system is displayed on the pilot's landing indicator together with the "nose-up," "nose-down" information from the present system. Such combined information could be displayed on the well known cross-pointer type indicator, the information derived according to the present invention being applied to the horizontal pointer, and the I.L.S. localizer information being applied to the vertical pointer. This combined indicator would of course be in addition to the normal I.L.S. indicator.

What I claim is:
1. The method of landing an aircraft which comprises: deriving a first signal proportional to the rate-of-change of a height-dependent-variable whose rate-of-change with height experiences a smooth continuous variation near ground level, deriving a second signal proportional to aircraft fore-and-aft attitude, comparing said signals and controlling said aircraft's attitude so as to cause said second signal to exhibit a constant relationship to said first signal at all times during the final approach of the aircraft to touch down.

2. The method of landing an aircraft which comprises: deriving a first signal proportional to the time-rate-of-change of a height-dependent-variable exhibiting a flare-out characteristic near ground level, deriving a second signal proportional to aircraft fore-and-aft attitude, comparing said first and second signals and controlling said aircraft's attitude so as to cause said second signal to exhibit a constant relationship to said first signal at all times during the final approach of the aircraft to touch down.

3. The method of landing an aircraft which comprises: deriving a first electrical signal proportional to time-rate-of-change of an under-wing air pressure that experiences the so-called ground effect; deriving a second electrical signal proportional to aircraft fore-and-aft attitude; comparing said first and second signals and controlling the attitude of said aircraft in a manner such that said second signal exhibit a constant relationship to said first signal at all times during the final approach of the aircraft to touch down.

4. In an aircraft, pressure-sensitive means for measuring an under-wing pressure of said aircraft, said pressure-sensitive means being situated at a position in said wing at which said under-wing pressure experiences the so-called ground effect, means for generating a first signal proportional to the time-rate-of-change of said under-wing pressure, means for generating a second signal proportional to the fore-and-aft attitude of the aircraft, and means for comparing said first and second signals.

5. In an aircraft, pressure-sensitive means for measuring an under-wing pressure of said aircraft, said pressure-sensitive means being situated at a position in said wing at which said under-wing pressure experiences the so-called ground effect, means for generating a first signal proportional to the time-rate-of-change of said under-wing pressure, means for generating a second signal proportional to the fore-and-aft attitude of the aircraft, an automatic pilot system, and means for comparing said first and second signals and for generating a third signal proportional to the difference between said first and second signals, means for transmitting said third signal to said automatic pilot system, said automatic pilot system including means for controlling the fore-and-aft attitude of the aircraft to maintain said third signal constant.

References Cited in the file of this patent

UNITED STATES PATENTS

| | | |
|---|---|---|
| 2,474,618 | Divoll | June 28, 1949 |
| 2,498,064 | Borell | Feb. 21, 1950 |
| 2,611,128 | Pine et al. | Sept. 16, 1952 |
| 2,717,132 | Cooper | Sept. 6, 1955 |
| 2,829,847 | Owen | Apr. 8, 1958 |

FOREIGN PATENTS

| | | |
|---|---|---|
| 104,888 | Australia | Feb. 7, 1937 |